United States Patent [19]
Farmont

[11] Patent Number: 4,844,535
[45] Date of Patent: Jul. 4, 1989

[54] MOTOR VEHICLE SUNROOF

[76] Inventor: Rolf Farmont, Hortensienstrasse 17, Düsseldorf 30, Fed. Rep. of Germany

[21] Appl. No.: 107,356

[22] Filed: Oct. 9, 1987

Related U.S. Application Data

[63] Continuation-in-part of Ser. No. 91,665, Aug. 17, 1987, abandoned.

[30] Foreign Application Priority Data

Oct. 9, 1986 [DE] Fed. Rep. of Germany ....... 3634450

[51] Int. Cl.⁴ .............................................. B60J 7/00
[52] U.S. Cl. .................................... 296/216; 296/224; 49/504; 52/476; 52/766
[58] Field of Search ............... 296/216, 224; 49/504; 52/476, 766, 768

[56] References Cited

U.S. PATENT DOCUMENTS

| | | | |
|---|---|---|---|
| 3,296,763 | 1/1967 | Curl | 52/766 X |
| 4,672,783 | 6/1987 | Frampton | 296/216 X |
| 4,728,146 | 3/1988 | Srdinko | 296/216 |

FOREIGN PATENT DOCUMENTS

| | | | |
|---|---|---|---|
| 236615 | 3/1964 | Fed. Rep. of Germany | 52/766 |
| 3241652 | 12/1984 | Fed. Rep. of Germany | |
| 3329407 | 2/1985 | Fed. Rep. of Germany | |
| 3545973 | 8/1986 | Fed. Rep. of Germany | |
| 277944 | 11/1964 | Netherlands | 52/476 |
| 945894 | 1/1964 | United Kingdom | 52/766 |

Primary Examiner—Dennis H. Pedder
Attorney, Agent, or Firm—HOrst M. Kasper

[57] ABSTRACT

The invention relates to a sunroof (1) for motor vehicles with a cover frame (3). This cover frame is formed by a first frame (5) and a second frame (6) and with a cover (4), which can be opened and closed. The cover frame (3) can be fixed in position by clamping of the roof skin (2) in the region of the opening edge (2') between the first and second frame at the vehicle top. The clamping mechanism allows the maintenance of the required clamping forces between the first and the second frame. Openings (8, 8', 8") can be distributed around the circumference of the first frame. The second frame carries levers (9) which can be slid through the openings of the first frame and can be tilted, in the mounted state, into a bolting position. The lever (9) can have a rest state at the first frame upon tilting in a bolting position and the lever (9) exerts the required clamping forces between the first and the second frame. A gripping piece (10) can be provided with a longer lever arm than the corresponding length of the lever (9) for tilting the lever (9).

20 Claims, 11 Drawing Sheets

MOTOR VEHICLE SUNROOF

CROSS-REFERENCE TO RELATED APPLICATIONS

This application is a continuation-in-part application of another application filed Aug. 17, 1987 and bearing Ser. No. 07/091,665, abandoned, PCT/EP No. 86/00748. The entire disclosure of this latter application, including the drawings thereof, is hereby incorporated in this application as if fully set forth herein.

BACKGROUND OF THE INVENTION

1. Field of the Invention

The present invention relates to a sunroof for motor vehicles with a first and second frame forming a cover frame and a cover which can be opened and closed, where the cover frame can be fixed in position by clamping of the roof skin in the area of the edge of the opening in between the first and second frame at the vehicle top and where a clamping mechanism allows for the maintaining of the required clamping forces between the first and second frame.

2. Brief Description of the Background of the Invention Including Prior Art

Such sunroofs are known from the German Pat. DE-PS No. 32 41 652. For this purpose, a locking clamping connection is known as a clamping mechanism from the German Patent Application Laid Open DE-OS No. 35 45 973. According to this reference, either a web, provided with locking noses, lockingly engages into a slot of the counter frame provided with corresponding locking elements in order to furnish a clamping connection, or a particular clamping profile running around the cover frame is employed, which is placed between one frame and its counter frame, and thus the two partial frames of the cover frame are maintained in a final position clamping the roof skin. Alternatively, a first partial frame, with a C-shaped cross-section, can be locked with a second partial frame which, in turn, is adhesively attached to a third partial frame, or alternatively welded, screwed, or locked. With such a sunroof, a screwing of the first and second frame based on the clamping connection can be dispensed with. However, it is nevertheless difficult to furnish, during the mounting of the frame, the required clamping forces for a permanently fixed and tight attachment of the cover frame at the roof skin, because the first and the second frame have to be pressed with such force with the fingers of one hand against one another in fitting position as required by the relatively high clamping force at the roof skin, while the second hand has to press the clamping profile into a relatively narrow groove until a locking is achieved. The use of clamping tools, point-focally engaging between the first and the second frame and connecting the first with the second frame, is prohibited because of the danger of damaging the roof skin or, respectively, of the synthetic plastic material employed for the production of the cover frame. The surrounding clamping profile can be dispensed with if the first and the second frame can be immediately lockingly engaged with one another such that the fingers of both hands of the assembly worker are freely available for the application of the required clamping force. However, the clamping force to be furnished at a certain point becomes thereby only slightly larger and it has to be considered that the locking connection, in case of a possibly necessary dismounting and disassembling of the cover frame, is destroyed and the cover frame cannot be reemployed.

SUMMARY OF THE INVENTION

1. Purposes of the Invention

It is an object of the present invention to provide a sunroof for a vehcle of the kind recited, which is not associated with the above-stated disadvantages.

It is a further object of the present invention to provide a construction of a sunroof for a vehicle where the clamping forces required can be furnished by a single assembly worker in a simple and safe way.

It is a further object of the invention to provide a connection between the frames of a sunroof without employing a particular clamping profile.

These and other objects and advantges of the present invention will become evident from the description which follows.

2. Brief Description of the Invention

The present invention provides for a sunroof for vehicles having a roof skin comprising a first frame with openings distributed along the circumference of the first frame and a second frame matching the first frame for forming a cover frame for a sunroof of a vehicle, with the two frames clamping around an edge of an opening in a roof skin of a vehicle. The cover frame can be fixed by clamping the roof skin, in the region of the opening edge, between the first and the second frame at the top of the vehicle. A clamping mechanism allows for the maintenance of the required clamping forces between the first and the second frame. Levers, carried by the second frame, can be slid through the openings of the first frame and can be tilted in the mounted state into a bolting position for bolting the first frame to the second frame. The levers have a rest state at the first frame upon tilting in a bolting position. The levers exert the required clamping forces between the first and the second frame for holding the edge of the roof skin between the first frame and the second frame. Gripping pieces attached to corresponding levers, extending the lever arm, allow for comfortable tilting of the levers. A sunroof cover, to be supported by the second frame, can be opened and closed.

The lever can be completely disposed inside of the cross-section of the cover frame when the lever is in a bolting position. The gripping piece can be solidly fixed to the lever. Preferably, the gripping piece is submerged, in its bolting position, into a recess of the cover frame. The lever and the gripping piece can be locked in the bolting position.

The invention sunroof can comprise means for supporting adjustable positioning for the lever into a fixed position before a tilting into a bolting position. The first and the second frame can be maintained in their mutual position by the lever without any substantial clamping forces having to be exerted onto the roof skin of the vehicle.

Preferably, the frame includes frame struts for providing stability. The levers can be tilted around tilting axles, which tilting axles of the levers can be disposed at a right angle relative to the direction of extension of the frame struts. Preferably, the tilting axles of the levers are disposed in parallel to the plane of the roof skin. The gripping pieces can be directed with their free end away from corner regions of the first frame and of the second frame, when in the bolting position.

A method for mounting a sunroof for vehicles having a roof skin comprises the cutting of an opening for a sunroof into a top skin of a vehicle. A first frame, with openings distributed along the circumference of the first frame, is placed against a first side of the opening along the edge of the opening. A second frame, matching the first frame, is placed against the first frame for forming a cover frame for a sunroof of a vehicle, with the two frames clamping around an edge of an opening in a roof skin of a vehicle. Levers carried by the second frame are slid through the openings of the first frame. The cover frame is fixed to the edge of the opening in the roof skin by clamping the roof skin in the region of the opening edge between the first and the second frame at the top of the vehicle. A clamping mechanism allows for the maintenance of the required clamping forces between the first and the second frame. The levers are tilted, in the mounted state of the first frame and of the second frame, into a bolting position for bolting the first frame to the second frame. The levers are locked in a rest state at the first frame upon tilting in a bolting position for inducing the levers to exert the required clamping forces between the first and the second frame for securely holding the edge of the roof skin between the first frame and the second frame.

The levers can engage with gripping pieces attached to corresponding levers, thereby extending the lever arm for allowing for a comfortable tilting of the levers.

A gripping piece, attached to the lever in a bolting position, can be submerged into a recess of the cover frame. The lever can be locked in the bolting position and the first and the second frame can be maintained in their mutual position by the lever without any substantial clamping forces having to be exerted onto the roof skin of the vehicle.

In accordance with the invention, the first frame is provided with openings distributed along its circumference and the second frame carries levers which can be moved through the openings of the first frame and which can be tilted into a bolting position in the assembled and mounted state. Furthermore, the lever can rest at the first frame upon tilting into the bolting position and the required clamping forces between the first and second frames can be exerted and, furthermore, gripping pieces for tilting the levers can be provided with a lever arm extended longer than the length of the levers. According to the present invention, tiltable levers are employed, which provide the required clamping forces by their tilting action.

Each one of these levers can furnish about the same clamping force as the up-to-now conventional screws. In contrast to screws, the levers according to the invention have to be turned only by 90 degrees in general. The force required for this purpose can be procured by the assembly worker in an ergonomically favorable manner, since the pressing together of the two partial frames between the thumb and the other fingers of one hand can be dispensed with, in contrast to conventional clamping connections. In particular, the invention gripping pieces allows a relatively large force magnification and amplification such that the relatively large clamping forces, to be provided by the lever, require a substantially smaller force expenditure at the gripping piece.

Sun roofs according to the invention are all sliding and/or lifting roofs with light-permeable or light-impermeable sliding and/or liftable cover, both for installation during the production of the vehicle as well as for retrofitting of a vehicle.

The first and second frames form jointly the cover frame. As preferred, these first and second frames can be, in each case, a closed loop or can be formed from several parts, in particular from individual frame struts. Furthermore, the so-called trimming rings, recited in the German Patent Application DE-OS No. 35 45 973, are to be considered as the first or second frame in accordance with the invention. The frame material can consist of, for example, metal and, in particular, light metal or, alternatively, as is preferred, plastic, in particular of fiber-reinforced plastic. Advantageously, at least one of the two frames is a synthetic plastic formed part which is made as a single piece and which is closed around its circumference. One of the two (first or second) frames can already be solidly connected with the top of the vehicle during production and assembly at a vehicle factory. In particular, this frame can be formed as a single piece of the roof skin, as explained and illustrated in the German Patent Application Laid Open DE-OS No. 35 45 973 in connection with its FIG. 11. Then the clamping of the roof skin is reduced to a tensioning of the roof skin with the frame, which can be a first or a second frame, not yet connected to the roof skin.

The first and second frame are preferably provided, at least in immediate proximity of the levers, with cooperating contact faces disposed perpendicular to the tensioning direction. The contact faces allow to transfer the clamping forces in a particularly efficient way onto the roof skin.

Any kind of tiltable levers are suitable as "levers." The effective length of the lever should be as short as possible and does not have to be substantially larger than the distance between the tilting axle of the lever and the edge of the opening in the first frame through which the lever passes when mounted at the vehicle. Among others, eccentric pieces and cams can be employed as tiltable levers, when they are rotatable around a cam axis or an eccentric axis.

Under the term "mounted state," there is to be understood such a situation where the first frame is attached at the one side of the roof skin, and the second frame is attached at the opposite side of the roof skin and, in fact, irrespective whether both frames are already tensioned with respect to each other or not. As soon as the two grames are tensioned against each other, the levers are then placed in their "bolting position."

Under the term "gripping pieces," there is to be understood levers which, as a rule, are single-arm levers, and which levers, force-lockingly or form-lockingly, can be connected or are connected or form a single piece with these levers, according to the present invention. The force engages at a free end of a lever forming a gripping piece for the tilting of the invention lever into the bolting position. For example, a screwdriver can serve as a gripping piece, where the tip of the screwdriver engages in a corresponding recess of an eccentric piece or cam in radial direction. According to another embodiment of the invention, the gripping piece is permanently, and in particular in one piece, connected to the lever and preferably immerses, completely or nearly completely, into the bolting position in a recess of the cover frame such that interfering protrusions are avoided at the cover frame. In the same manner, the lever is preferably disposed completely inside of the cover frame cross-section, at least when it is placed into the bolting position.

If, according to a further embodiment of the invention, the lever or the gripping piece can be locked in the bolting position, then the size of the force of the clamping force is thereby more exactly definable as compared to a frictional engagement of the lever into the bolting position which, in principle, is of course possible.

The mounting of the cover frame can be simplified according to a further embodiment of the invention, where the lever can be brought into a fixing position prior to the tilting into the bolting position, and where the first and the second frame are maintained in their mutual position without any substantial clamping forces being exerted onto the roof skin of the motor vehicle. Thereby, the exact position of the frame can be controlled from all sides before the roof skin is clamped between the two partial frames. In particular, the exact seating of the sealing elements, usually placed at the roof skin, can be checked before the sealing elements are deformed under the clamping force. The levers are brought in particular into the fixing position in that they are rotatable around an axis parallel to the insertion direction extending in a standard way relative to the roof skin, or in that they are tiltable around a tilting axle extending crosswise to the sliding direction. Here, the same tilting axle can be employed around which the lever is tilted into its bolting position. Alternatively, the lever can be moved sideways into a fixing position, crosswise to the recited sliding direction or, alternatively, the lever can be inserted or stuck in a fixed position in the sliding direction. In all cases, the lever should be able to rest in the fixing position, for example by a slight engaging, without the assembly worker being forced to hold it in the fixing position.

The above-recited construction parts to be employed, according to the invention, are subjected in their size, shape, material, and technical conception to no special or exceptional conditions such that the selection criteria, employed in the respective field of application, can be applied without limitation.

Further details, features, and advantages of the subject of the invention result from the following description of the respective drawing, wherein a preferred embodiment of the invention sunroof is illustrated.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BREIF DESCRIPTION OF THE DRAWING

In the accompanying drawing, in which are shown several of the various possible embodiments of the present invention:

FIG. 6a is another clamping mechanism in the representation as shown in FIG. 5a;

DESCRIPTION OF INVENTION AND PREFERRED EMBODIMENT

In accordance with the present invention, there is provided a sunroof 1 for vehicles with a cover frame 3 which is formed by a first and a second frame and a cover 4 which can be opened and closed. The cover frame 3 can be fixed by clamping the roof skin 2 in the region of the opening edge 2' between the first and the second frame at the top of the vehicle. A clamping mechanism allows the maintenance of the required clamping forces between the first and the second frame. The first frame is provided along its circumference with hole openings 8, 8', 8". The second frame carries levers 9 which can be slid through the openings of the first frame and can be tilted in the mounted state into a bolting position. The lever 9 can rest at the first frame upon tilting in a bolting position. The required clamping forces between the first and the second frame can be exerted by the lever 9. For tilting the lever 9, the gripping piece 10 can be provided with a longer lever arm than the corresponding length of the lever 9.

The lever 9 can, at least in the bolting position, be completely disposed inside of the cross-section of the cover frame. The gripping piece 10 can be permanently connected to the lever 9 and the gripping piece 10 can be submerged, in its bolting position, into a recess 12 of the cover frame 3. The lever 9 or the gripping piece 10 can be locked in the bolting position.

The lever 9 can be rotated, tilted, moved backward, inserted, or stuck, into a fixed position before the tilting into the bolting position. The first and the second frame can be maintained in their mutual position by the lever 9 without any substantial clamping forces having to be exerted onto the roof skin 2 of the vehicle. The tilting axles 11 of the levers 9 can be disposed at a right angle relative to the direction of extension of the frame struts 3". The tilting axles 11 of the levers 9 can be disposed in parallel to the plane of the roof skin 2. The gripping pieces 10 in the bolting position can be directed with their free end away from the corner regions 3' of the cover frame 3.

The embodiment according to FIGS. 1a to 4b represents a best mode of the present invention.

Figure 1A:
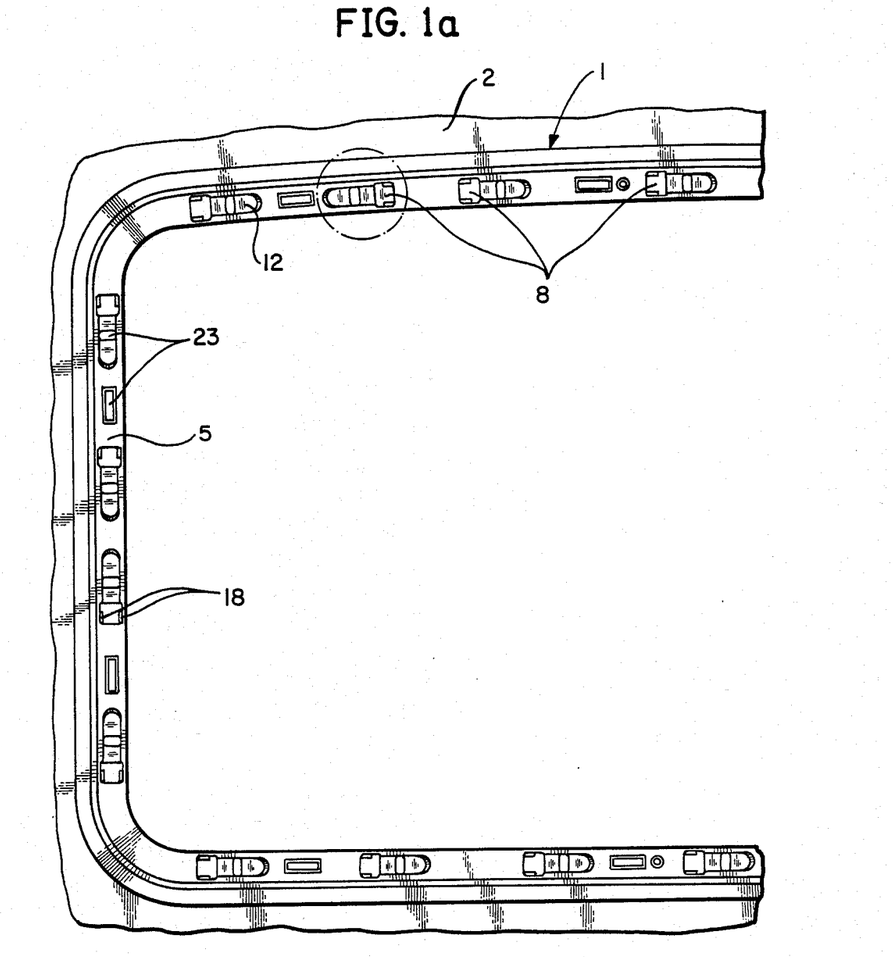
FIG. 1a shows a sunroof mounted in a vehicle roof, in a bottom view, where only half of the inner frame is visible, which is designated here as the "first" frame.
Figure 1B:
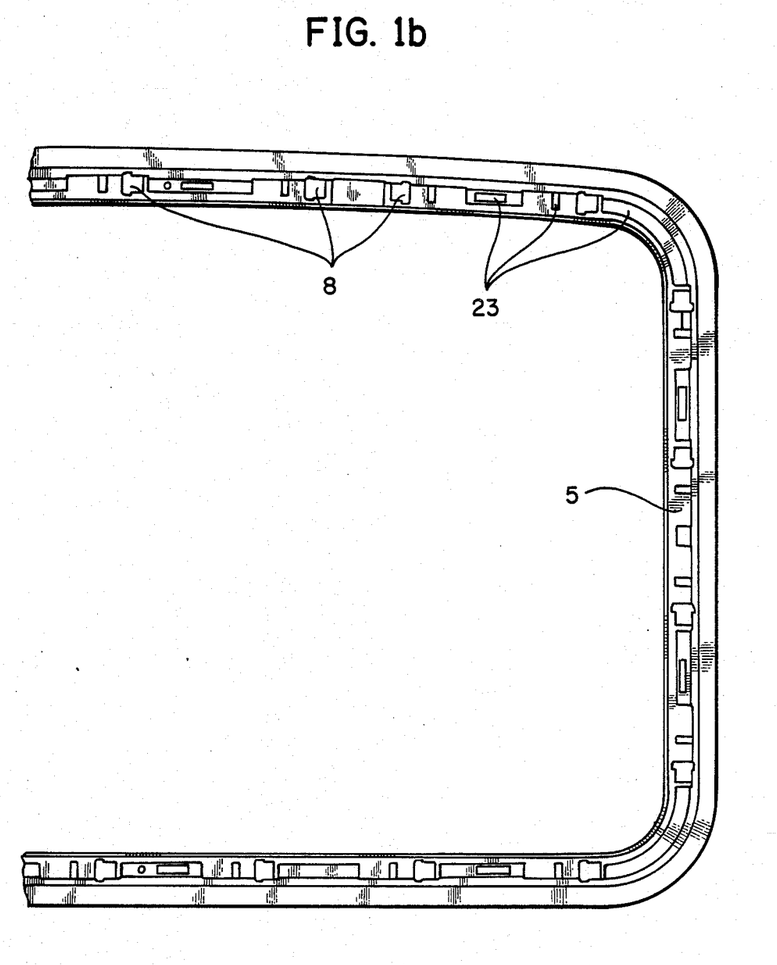
FIG. 1b shows a view of the "first" frame according to FIG. 1a, in a partial representation of the same frame half, in a top view.
Figure 1C:
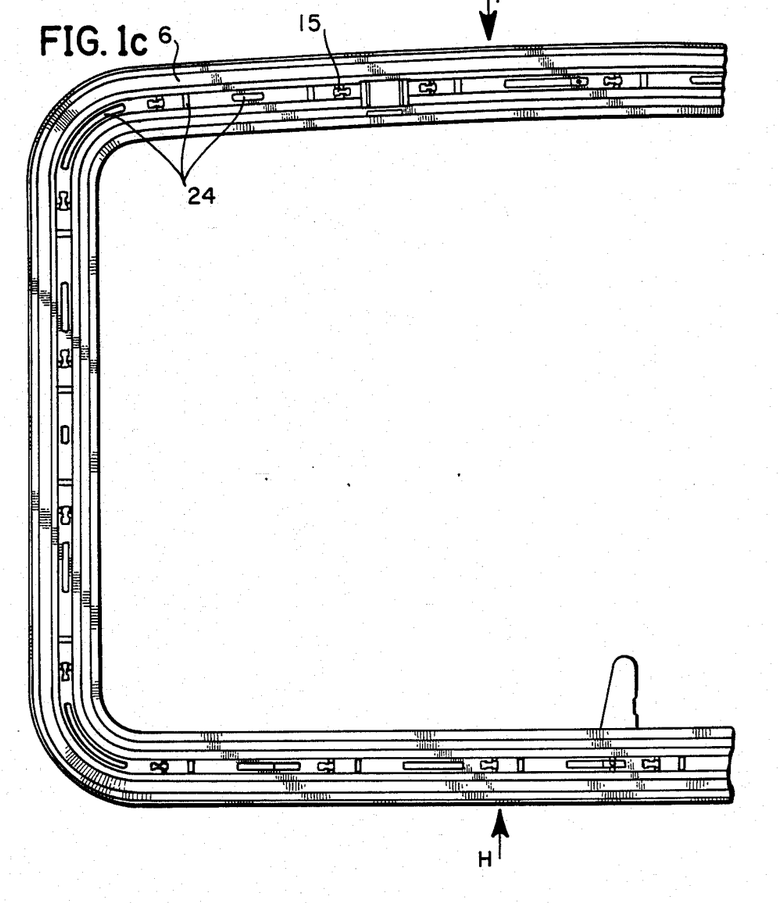
FIG. 1c is a view of the "second" frame of the same sunroof, of half of the outside frame, in a bottom view (view A according to FIG. 1d)
Figure 1D:
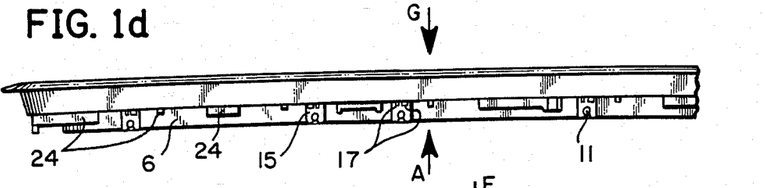
FIG. 1d is a front view of the outer frame of the embodiment of FIG. 1c (view F according to FIG. 1c)
Figure 1E:
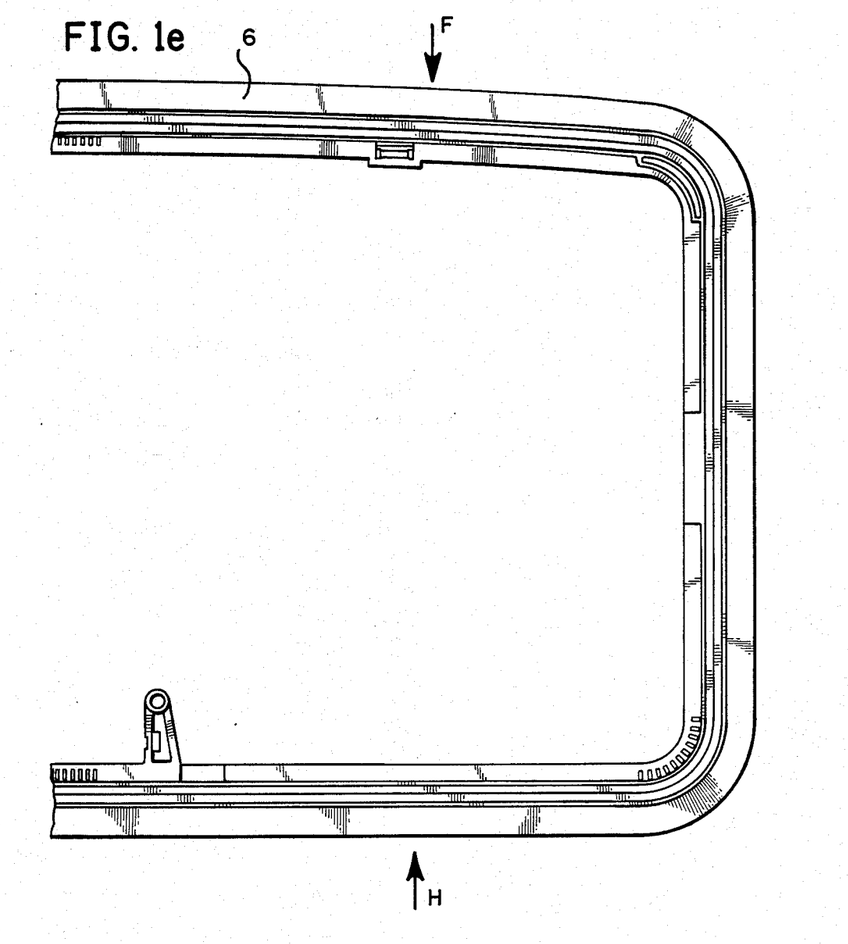
FIG. 1e is a top view of the same outer frame half (as in FIGS. 1c, 1d) (view G according to FIGS. 1d and 1f)
Figure 1F:
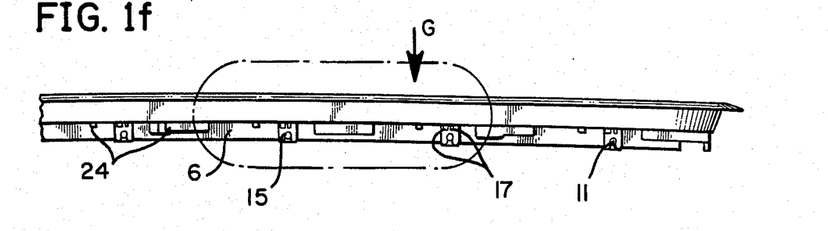
FIG. 1f is a rear view of the same outer frame (view H according to FIGS. 1c and 1e)
Figure 1G:
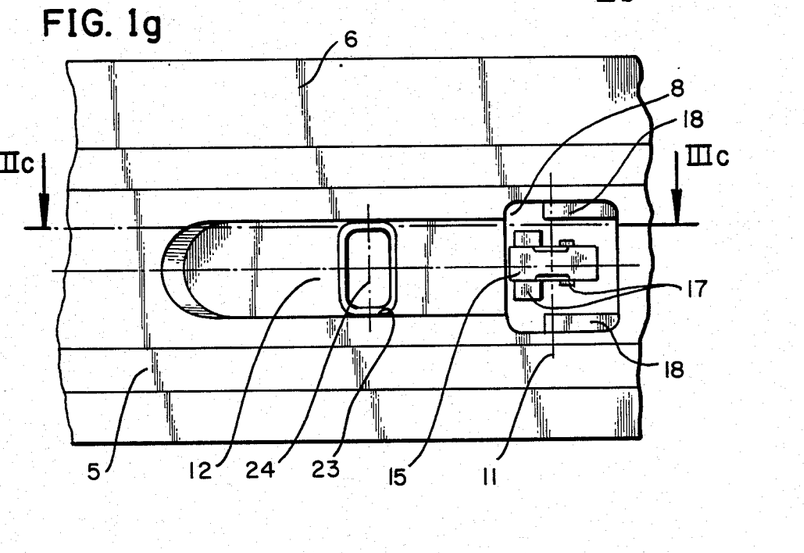
FIG. 1g is a view of the inner frame according to FIG. 1a, in an enlarged detail representation (part view), where the outer frame has already been placed in position, from a direction corresponding to the rear side of the paper, however, without the invention lever and the invention gripping piece.
Figure 2A:
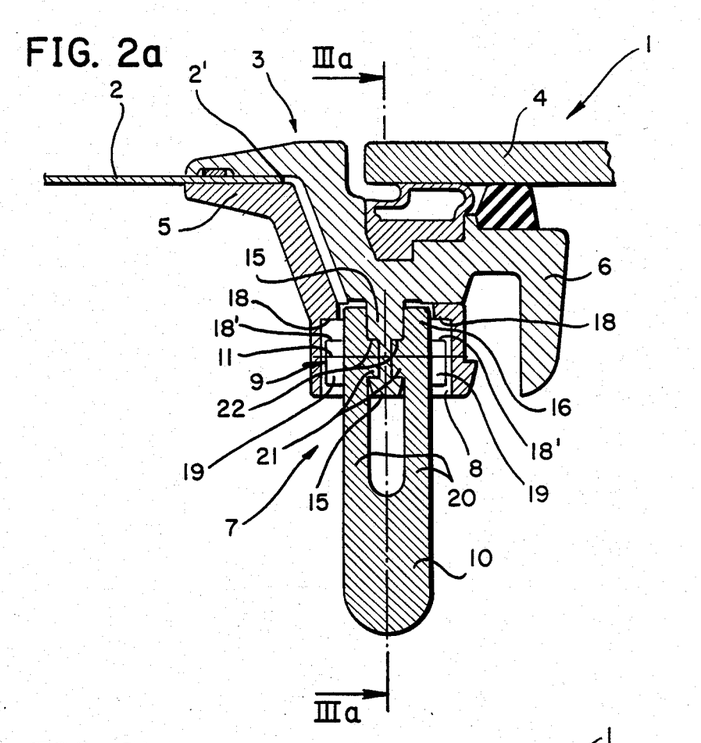
FIG. 2a is a view of the same sunroof according to FIGS. 1a to 1h, in a vertical, cross-sectional view across to the cover frame (along the section line IIa—IIa according to FIG. 3a), where the inner frame and the outer frame already clamp the roof skin in between themselves, while the represented lever/gripping piece combination has not yet been tilted into the bolting position.
Figure 2B:
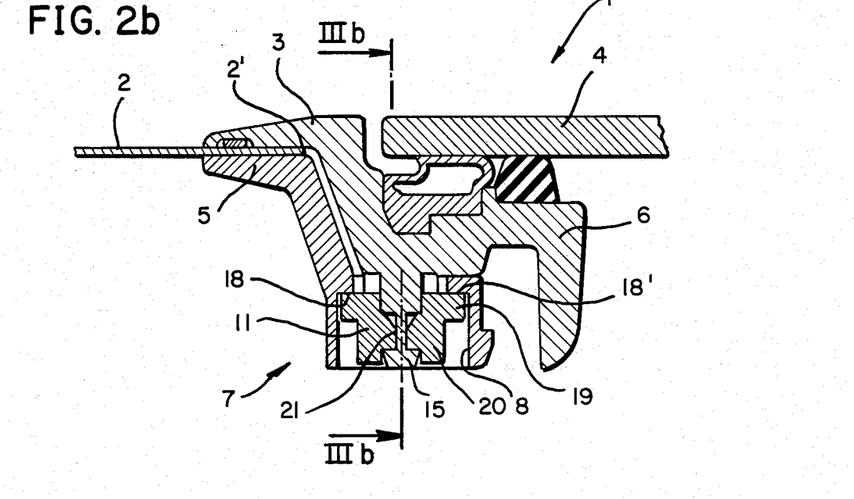
FIG. 2b is a view of the sunroof according to the same sectional view as FIG. 2a, however, with lever/gripping piece combination tilted into a bolting position (section along line IIb—IIb according to FIG. 1h)

According to FIG. 1a, a sunroof 1 is mounted into the roof skin 2 of a vehicle. The sunroof comprises a cover frame 3 and a cover 4 which can be opened and closed in a conventional manner. The cover 4 has disk-shape and forms a plane nearly jointly with the roof skin 2, as illustrated in FIGS. 2a and 2b. For purposes of clarity, the operating mechanism of the cover is not illustrated, however, for example, it can be formed, such as is described in the German Pat. DE-PS No. 32 41 652.

Figure 7:
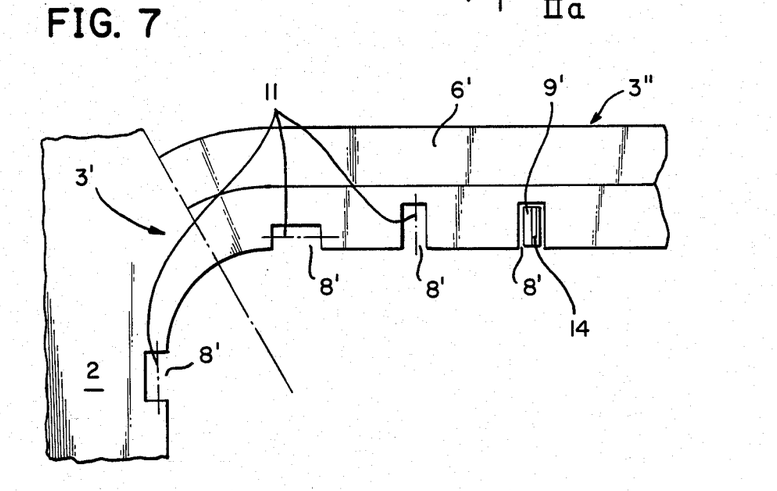
FIG. 7 is an illustration of another embodiment of a sunroof with a first frame, which is either formed as a single piece with the roof skin or which is solidly connected or connectable to the roof skin as shown with a dash-dotted line on the right.

The cover frame 3 comprises a first and a second frame according to FIGS. 2a and 2b. The embodiment illustrated in FIGS. 1a to 4b shows, as a first frame, an inner frame 5 which is tensioned and contacted from below to the roof skin 2 and, as a second frame, there is employed an outer frame 6 which can be tensioned from above against the roof skin 2. Of course, alternatively, the outer frame can assume the function of the first frame, and the inner frame can assume the function of the second frame. Such a reversal is illustrated in FIG. 7. The roof skin 2 is clamped between the outer frame 6 and the inner frame 5 in a water-proof and mechanically stable manner in the region of the opening edge 2', as illustrated in FIGS. 2a and 2b. In this way, the cover frame can be fixed to the top of the vehicle.

Form-locking elements 23 and 24 disposed at the first or, respectively, at the second frame assure a proper and exact positional mounting of the first and the second frame, where the form-locking elements 23 and 24 correspond relative to each other with respect to their shape and which are aligned to each other in the mounted state and which therefore engage one another in a form-locking way.

The clamping devices 7, according to the invention, take the place of the conventionally used screws for tensioning of the first and the second frame with the roof skin. The number of the clamping provisions 7 can correspond to a conventional number of screws. The clamping means 7 are more or less uniformly distributed along the circumference of the cover frame 3, where the corner regions 3' of the cover frame are preferably left free of clamping means 7. Nevertheless, sufficient clamping forces can also be exerted in this case on the corner regions. For this purpose, the tilting axle of the levers, which are to be illustrated in more detail below, are preferably disposed substantially at a right angle relative to the extension direction of the frame struts 3" of the cover frame 3. Furthermore, the free ends of the gripping pieces 10, to be illustrated in more detail, are directed, for this purpose in the bolting position, away from the corner regions 3' of the cover frame 3 such that the tilting axle of the levers can be disposed immediately at the transition between the corner regions 3' and the frame struts 3", as is illustrated in particular in FIG. 1a.

The clamping mechanism according to the invention maintains the required clamping forces between the first and the second frame. The clamping mechanism furthermore allows the proper tensioning and clamping of the cover frame with the roof skin and is associated with the following features:

The first frame, i.e., in the embodiment of FIGS. 1a to 4b, the inner frame 5, is provided with openings 8 distributed over its circumference. These openings can be multi-cornered in cross-section, as can be seen in FIG. 1a, or they can be round holes through the first frame. Alternatively, the openings can also be correspondingly shaped, for example as U-shaped edge recesses at the inner edge of the first frame directed away from the roof skin 2. Such break-outs 8' on the side of the inner edge in the outer frame 6' serving as a first frame are illustrated in the embodiment according to FIG. 7. Furthermore, in the embodiments according to FIGS. 5a and 6c, the outer frame 6" forms the first frame as defined in the context of the present invention.

The second frame, designated as outer frame 6 in the embodiment according to FIGS. 1c to 1f and 4b, is provided with levers 9 which are distributed such over the circumference of the second frame that they can be slid through the break-outs 8, 8' of the first frame. These levers are not shown directly in FIGS. 1c to 1f for purposes of clarity. Each lever 9 is provided with a tilting axle 11, which extends preferably in parallel to the plane of the roof skin and which runs about at a right angle relative to the extension direction of the frame struts 3". As can be recognized from FIG. 7, it is also possible that an extension of the tilting axle 11 runs in the same direction as the extension direction of the frame struts 3" or of the corner regions 3'.

Figure 1H:
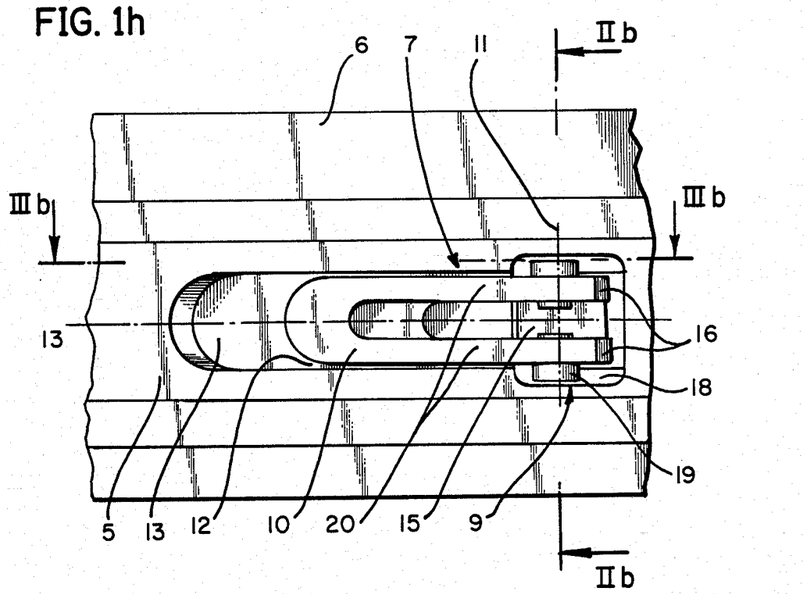
FIG. 1h is a view of the embodiment of FIG. 1g, however, with lever and gripping piece and, in fact, in bolted position.
Figure 3A:
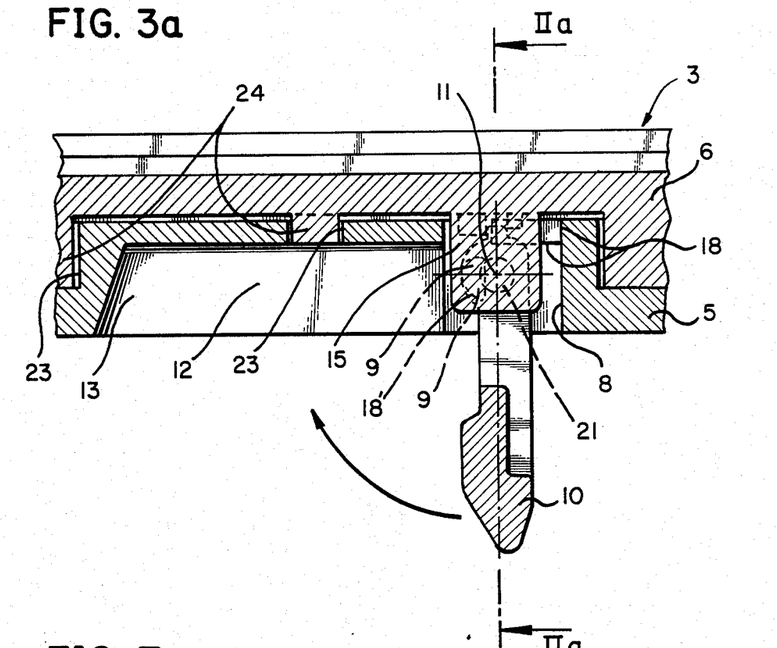
FIG. 3a is a view of the same sunroof as FIG. 2 in a vertical section along the cover frame in a not yet bolted position of the lever/gripping piece combination (in a section along the section line IIIa—IIIa according to FIG. 2a) however, without cover and cover seal.
Figure 3B:
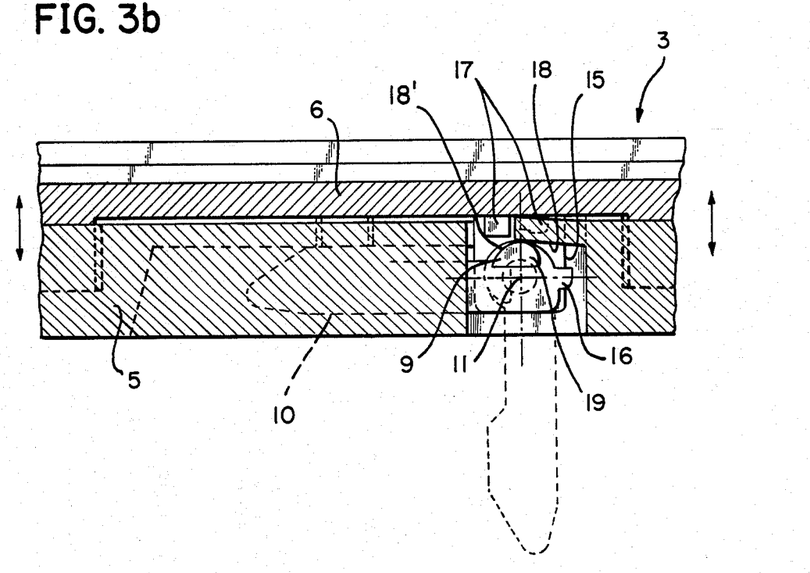
FIG. 3b is a view of the same sunroof in the same kind of representation as FIG. 3a, however, with the lever/gripping piece combination disposed in a bolting position and in a sectional view, staggered in parallel, relative to FIG. 3a (section along section line IIIb—IIIb according to FIGS. 1h and 2b), however, again without cover and cover seal.
Figure 3C:
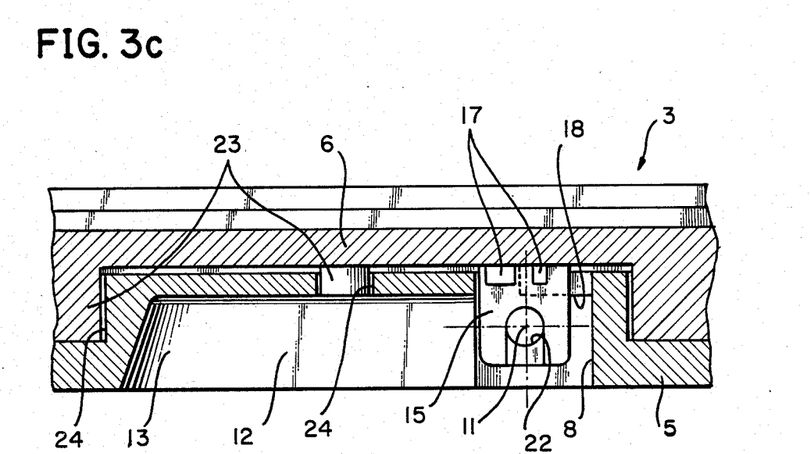
FIG. 3c is a view of the same sun roof in a further sectional view according to FIGS. 3a and 3b, however, without lever/gripping piece combination (section along section line IIIc—IIIc according to FIG. 1g)
Figure 5A:
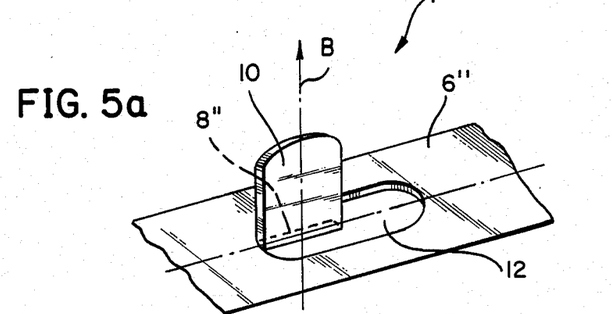
FIG. 5a is a partial view in a schematic representation of a clamping mechanism for a sunroof in a first lever position.
Figure 5B:
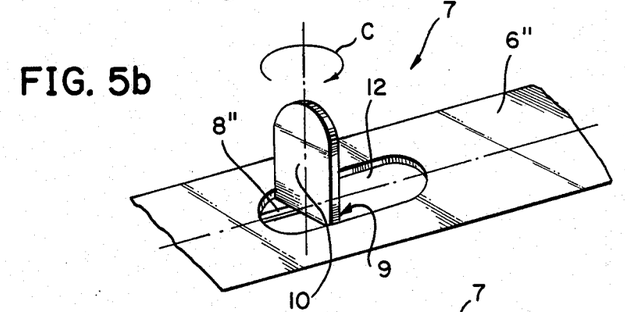
FIG. 5b is a partial view in a schematic reprsentation of a clamping mechanism for a sunroof in a second lever position.
Figure 5C:
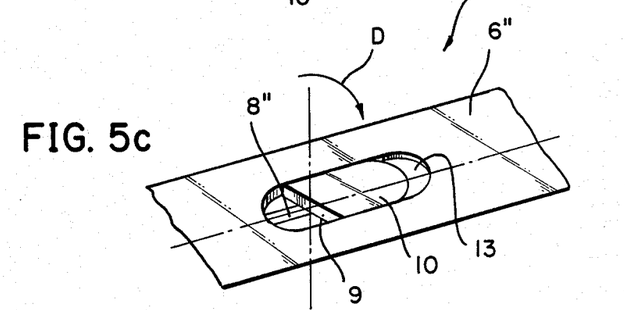
FIG. 5c is a partial view in a schematic representation of a clamping mechanism for a sunroof in a third lever position.
Figure 6A:
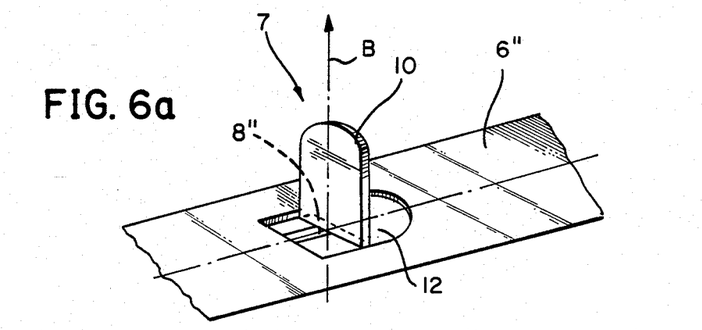
Figure 6B:
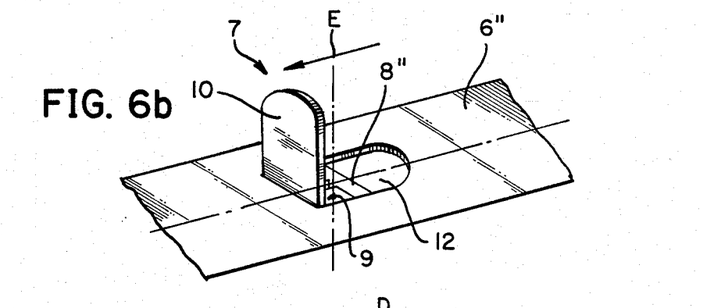
FIG. 6b is another clamping mechanism in the representation as shown in FIG. 5b.
Figure 6C:
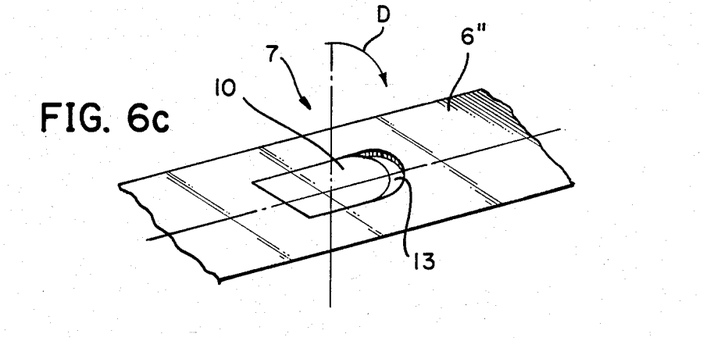
FIG. 6c is another clamping mechanism in the representation as shown in FIG. 5c.

As can be seen from FIGS. 1h to 3b, preferably, in the mounted state of the first and the second frame, the levers 9 are tiltable into a bolting position, as illustrated in FIGS. 1h, 2b, and 3b, as wel as in FIGS. 5c and 6c, where the tilting axle 11 can be formed in an arbitrary way. The tilting axle 11 runs in the paper plane according to FIGS. 2a and 2b. The lever 9 is hinged to the second (outer) frame.

According to the invention, the levers 9 contact the first frame upon tilting into the bolting position. The levers 9 preferably come to rest as close as possible at the edge of the opening or break-out 8 or 8'. In the course of a further tilting, they then exert a clamping force between the first and the second frame which, in general, increases with the tilting angle. Bolting pressure surfaces, at the first inner frame 5, and corresponding sliding faces 18' are curved in the tilting direction of the lever 9 and are disposed at the circumference of protrusions 19. The protrusions 19 are disposed on two sides, representing two directions along the tilting axle 11, of the lever 9. The protrusions 19 form a part of a lever 9 and serve preferably for the purpose of locking the first frame in position, where the bolting pressure surfaces are provided as sliding faces 18 and are disposed in pairs. These protrusions 19, having a similarity to a curved disk, have approximately the shape of a section of a circle segment. The circle section is overall disposed next to the tilting axle 11 of the lever 9 and the chord or sinew of the lever 9 runs about parallel to the longitudinal direction of the gripping piece 10 and of the lever 9. In this way, the protrusions 19 can be positioned with levers 9, directed perpendicular to the cover frame 3, as illustrated in FIG. 2a and in particular in FIG. 3a, through the broadest regions of the openings or break-outs 8 in the first frame 5. Upon tilting of the lever 9 into the bolting position, then the sliding faces 18 and 18' come to a mutual rest and under the increasing compression pressure, as illustrated already previously, compare FIGS. 2b and 3b.

Figures 4A, 4B:
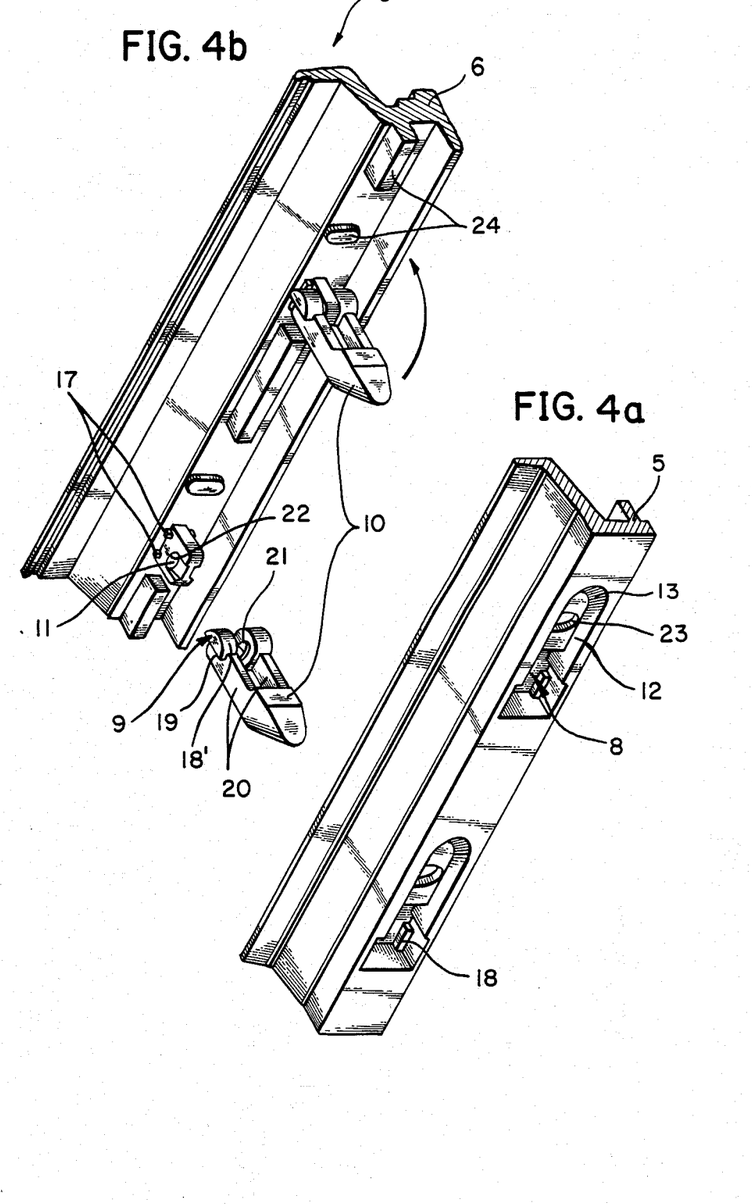
FIG. 4a is a perspective detail view of the inner frame according to FIGS. 1a/b.
FIG. 4b is a perspective detail view of the outer frame according to FIG. 1f, however, in part with already mounted levers and gripping pieces.

In order to alleviate the joining of the first frame 5 and of the second frame 6, there are provided and disposed at the second frame 6, on the one hand, and at the levers 9, on the other hand, mutually corresponding locking elements 16 and 17 such that the lever 9 and the gripping pieces 10 are engaged in the mounting position, as shown in FIGS. 2a, 3a, and 4b, protruding perpendicularly from the second frame 6, although they can be tilted into the bolting position with the individual fingers of one hand of an assembly worker.

The actual length of the lever 9 is preferably as short as possible. Nevertheless, in order to obtain and furnish the required clamping force, a gripping piece 10 is provided which is preferably permanently associated and connected with the lever 9. The gripping piece 10 is immersed into a recess 12 in the bolting position, according to FIGS. 1h and 3b. An engagement trough 13 in the extension of the recess 12 allows an engagement of the gripping piece 10 placed in bolting position by a finger or by a screwdriver, in case a debolting and opening is desired. Furthermore, a screwdriver is suitable as a gripping piece, which engages in a slot 14, as shown in FIG. 7, of a lever formed as an eccentric cam piece 9' for tilting into or out of the bolting position. The effective length of the gripping piece is in each case longer than the actual length of the lever 9.

According to FIGS. 1g to 4b, the second frame is provided with bearing bolts 15 which are connected as single pieces to the second frame and which can be slid through the openings or break-outs 8 of the first frame in order to provide a tiltable positioning of the lever 9 and the gripping piece 10. According to this embodiment, the lever 9 and the gripping piece 10 each form jointly a two-armed lever which can be tilted around the tilting axle 11. It has proven to be particularly advantageous to produce this lever/gripping piece combination as a single piece U-shaped form piece of a synthetic plastic material and to engage it in the region of the tilting axle 11 with the bearing bolt 15 at the second frame. In this context, the U-shaped arms 20 of the U-shaped form part are springingly and elastically pressed apart until their tilting support bolt 21 is aligned with corresponding tilting bearing bolt recesses 22 in the bearing bolt 15 and correspondingly springs back, as illustrated in FIGS. 2a, 2b, and 4b.

If desired, the position of the gripping piece can be fixed by corresponding simple locking elements at the gripping piece and at the cover frame in the bolting position. The locking elements, however, are not illustrated in detail in the drawings. The locking forces can be extremely small based on the available length of the lever. In order to avoid expensive back-cuts in the first and second frame, preferably formed as circumferntial single-piece plastic form parts, recesses extending rectangularly from the inside of the first frame can be provided as locking elements. The locking elements exhibit a joint open side face with the recesses for accepting the gripping pieces.

According to the embodiments of FIGS. 5a to 6c, the lever 9 and the gripping piece 10, connected as a single piece, are shifted through a corresponding opening or breakout 8" in the same way as illustrated in connection with FIGS. 1a to 4b. Thus, according to this embodiment, the first frame has openings which allow the lever 9 and extension to pass with the cam protrusion 19 through for insertion, but upon rotation of the lever 9, the cam protrusion 19 is displaced, when seen from the top, into a position of locking engagement with the first frame 5. Preferably, this locking engagement is secured by an elastic and/or snap-in means providing some resistance to unlocking of the lever 9. The snap-in feature can be provided by a corresponding form of the cam protrusion 19.

If the first and second frames rest still comparatively loosely at the roof skin, then the lever 9 is rotated with the gripping piece 10 around the sliding direction B as a rotation axis in the direction of the arrow C by preferably 90 degrees, as shown in FIG. 5b. The first and second frames are fixed already after the rotation of the gripping piece based on a corresponding shape and form of the opening or break-out 8" and of the gripping piece 10. According to a third step, the tilting D of the lever 9 with the aid of the gripping piece 10 into the bolting position provides for the clamping force as illustrated in FIGS. 5c and 6c. Corresponding steps and elements are employed in the embodiments according to FIGS. 6a to 6c, where however the fixing is performed by a backward motion step E according to FIG. 6b, instead of a rotation process of the gripping piece 10.

The lever 9 and gripping piece 10 are preferably formed as a combination piece, where the lever 9 is formed as a piece having two shaft extensions formed as support bolts 21 to be positioned in corresponding recesses of the second frame. Preferably the combination lever 9 and gripping piece 10 are formed as a U or as a yoke where the arms of the U or yoke carry the shaft extensions. Preferably, the shaft extensions are provided either both on the two outermost faces or at the two innermost faces of the ends of the arms of the U or yoke. When the combination lever 9 and gripping piece 10 are made of an elastic material, then it is possible to deform the U for securely positioning the shaft extensions into corresponding recesses of the first frame. The locking protrusions 19 are preferably disposed on opposite sides of respective arms of the yoke such that exertion of a locking force maintains the support bolts 21 in the recesses and prevents a jumping out of the support bolts 21 from the recesses. The diameter of the protrusion 19 can be from about one to two times the diameter of the support bolt. The width of the arms of the yoke can be from about 0.2 to 0.3 of the outer width of the long sides of the arms of the yoke. The connection section between the two arms of the yoke can have a thickness which corresponds to from about one third to two thirds of the total longitudinal extension of the yoke. The total length of the yoke can correspond to from about 0.5 to one times the overall width of the second frame. The outer width of the yoke arms can be from about 0.15 to 0.3 of the width of the second frame. The depth of the recess for the gripping piece can be 0.2 to 0.5 of the depth of the second frame and is preferably from about 0.3 to 0.4 of the vertical depth of the second frame. The connection section of the yoke can further be expanded versus the arms up to about two times the corresponding height of the arms as seen in a locking position of the gripping piece 10. The distance between the locations of the cover frame locks can be from about 0.8 to 3 times the length of the yoke and is preferably from about 1 to 2 times the length of the yoke. The width of the yoke is preferably from about 0.01 to 0.1 of the inner diameter of the opening to be covered with a sunroof. The length of the support bolts 21 is preferably from about 0.5 to one times the width of a corresponding arm of the yoke.

The first and second frame are preferably provided by a strip formed as a brace, where the material providing strength is divided between two perpendicular directions in a ratio of from about 0.5 to 2 between these directions. The thickness of the structural material of the second frame can be from about 0.1 to 0.2 times the overall width of the second frame. Advantageously, the hinged yoke is provided with a secondary intermediate locking position, where the yoke is disposed perpendicular to the plane of the second frame in order to allow easy positioning of the gripping pieces when the gripping pieces of the second frame are fed through the respective openings of the first frame.

It will be understood that each of the elements described above, or two or more together, may also find a useful application in other types of sliding roofs or sunroofs differing from the types described above.

While the invention has been illustrated and described as embodied in the context of a sunroof for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sunroof for vehicles having a roof skin comprising
   a first frame with openings distributed along the circumference of the first frame;
   a second frame mating with the first frame for forming
   a cover frame for a sunroof of a vehicle, with the two frames clamping around an edge of an opening in a roof skin of a vehicle, wherein the cover frame can be fixed by clamping the roof skin, in the region of the opening edge, between the first and the second frames at the top of the vehicle, and wherein a clamping mechanism allows the maintenance of clamping forces between the first and the second frame, said clamping mechanism including;
   levers carried by the second frame, which levers can be slid through the openings of the first frame and can be tilted into a bolting position for bolting
   the first frame to the second frame, and wherein the levers have a rest state upon tilting in a bolting position, and wherein the levers exert the required clamping forces between the first and the second frames for holding the edge of the roof skin between the first frame and the second frame;
   a gripping piece attached to each corresponding lever, extending the lever for allowing comfortable tilting of the levers;
   a sunroof cover to be supported by a frame selected from the group consisting of the first frame and the second frame for opening and closing said roof skin opening.

2. The sunroof for vehicles having a roof skin according to claim 1, wherein the lever is completely disposed inside of the cross-section of the first frame when the lever is in said bolting position.

3. The sunroof for vehicles having a roof skin according to claim 1, wherein the gripping piece is solidly fixed to the lever and wherein the gripping piece is submerged, in its bolting position, into a recess of the first frame.

4. The sunroof for vehicles having a roof skin according to claim 1, wherein the lever is provided with protrusions for locking the lever in the bolting position.

5. The sunroof for vehicles having a roof skin according to claim 1, wherein the gripping piece is locked in the bolting position by protrusions on the lever.

6. The sunroof for vehicles having a roof skin according to claim 1, further comprising means for supporting an adjustable positioning for the lever into a fixed position before a tilting into a bolting position, and wherein the first and the second frame are maintained in their mutual position by the lever.

7. The sunroof for vehicles having a roof skin according to claim 1, wherein the frame includes frame struts for providing stabiity, and wherein the levers tilt around tilting axles, which tilting axles of the levers are disposed at a right angle relative to the direction of extension of the frame struts.

8. The sunroof for vehicles having a roof skin according to claim 7, wherein the tilting axles of the levers are disposed in parallel to the plane of the roof skin.

9. The sunroof for vehicles having a roof skin according to claim 1, wherein the gripping pieces are directed with a free end away from corner regions of the first frame and of the second frame, when in the bolting position.

10. A method for mounting a sunroof for vehicles having a top skin, comprising
    cutting an opening for a sunroof into the top skin of a vehicle;

placing a first frame, with openings distributed along a circumference of the first frame, against a first side of the opening along the edge of the opening;

placing a second frame mating with the first frame against the first frame for forming a cover frame for a sunroof of a vehicle, with the two frames clamping around an edge of the opening the top skin of a vehicle, and sliding levers carried by the second frame through the openings for the first frame;

fixing the cover frame to the edge of the opening in the roof skin by clamping the roof skin in the region of the opening edge between the first and the second frames at the top skin of the vehicle, and wherein a clamping mechanism comprising said levers allows the maintenance of clamping forces between the first and the second frames; and tilting the levers of the second frame into a bolting position for bolting the first frame to the second frame; and locking the levers in a rest state at the first frame upon tilting in a bolting position for inducing the levers to exert the clamping forces between the first and the second frame for securely holding the edge of the roof skin between the first frame and the second frame.

11. The method for mounting a sunroof for vehicles having a roof skin according to claim 10, further comprising increasing the lever clamping force with a gripping piece attached to each lever, thereby extending the lever arm for allowing comfortable tilting of the levers.

12. The method for mounting a sunroof for vehicles having a roof skin according to claim 10, further comprising submerging a gripping piece, attached to the lever in a bolting position, into a recess of the cover frame; locking the lever in the bolting position; and maintaining the first and the second frames in their mutual position by the lever.

13. In a sunroof (1) for vehicles with a cover frame (3) which is formed by a first and a second frame and with a cover (4) which can be opened and closed, wherein the cover frame (3) can be fixed by clamping the roof skin (2) in the region of the opening edge (2') between the first and the second frame at the top of the vehicle, and wherein a clamping mechanism allows the maintenance of the required clamping forces between the first and the second frame, the improvement comprising openings (8, 8', 8") distributed around the circumference of the first frame, and where the second frame carries levers comprising said clamping mechanism (9) which can be slid through the openings of the first frame and can be tilted, in the mounted state, into a bolting position;

the lever (9) having a rest state at the frist frame upon tilting in a bolting position, and where the lever (9) exerts the required clamping forces between the first and the second frame, said lever being lengthened by a gripping piece.

14. The sunroof (1) for vehicles with a cover frame (3) according to claim 13, wherein the lever (9) is completely disposed inside of the cross-section of the first frame in the bolting position.

15. The sunroof (1) for vehicles with a cover frame (3) according to claim 13, wherein the gripping piece (10) is permanently connected to the lever (9), and the gripping piece (10) is submerged, in its bolting position, into a recess (12) of the first frame (3).

16. The sunroof (1) for vehicles with a cover frame (3) according to claim 13, wherein the lever (9) is provided with protrusions for locking the lever and gripping piece in the bolting position.

17. The sunroof (1) for vehicles with a cover frame (3) according to claim 13, wherein the lever (9) can be moved into a fixed position before the tilting into the bolting position, and wherein the first and the second frame are maintained in their mutual position by the lever (9).

18. The sunroof (1) for vehicles with a cover frame (3) according to claim 13, wherein tilting axles (11) of the levers (9) are disposed at right angle relative to the direction of extension of the frame struts (3").

19. The sunroof (1) for vehicles with a cover frame (3) according to claim 13 wherein the tilting axles (11) of the levers (9) can be disposed in parallel to the plane of the roof skin (2).

20. The sunroof (1) for vehicles with a cover frame (3) according to claim 13, wherein the gripping pieces (10), in the bolting position, can be directed with a free end away from the corner regions (3') of the cover frame (3).

* * * * *